(12) United States Patent
Hellmann

(10) Patent No.: US 7,748,157 B1
(45) Date of Patent: Jul. 6, 2010

(54) FISHING JIG

(76) Inventor: Paul F. Hellmann, 8440 Rt. 426, Corry, PA (US) 16407

( * ) Notice: Subject to any disclaimer, the term of this patent is extended or adjusted under 35 U.S.C. 154(b) by 0 days.

(21) Appl. No.: 11/706,949

(22) Filed: Feb. 15, 2007

(51) Int. Cl.
*A01K 91/00* (2006.01)
(52) U.S. Cl. .................................. 43/42.39
(58) Field of Classification Search ............... 43/42.39, 43/44.81, 42.37; D22/126, 127, 144
See application file for complete search history.

(56) References Cited

U.S. PATENT DOCUMENTS

| | | | | |
|---|---|---|---|---|
| D151,481 S | * | 10/1948 | Williamowjcz | D22/126 |
| 3,965,606 A | * | 6/1976 | Bingler | 43/42.16 |
| 4,713,907 A | * | 12/1987 | Dudeck | 43/42.39 |
| D326,703 S | * | 6/1992 | Rochford | D22/132 |
| D363,112 S | * | 10/1995 | O'Grady | D22/126 |
| D385,614 S | * | 10/1997 | Yano | D22/133 |
| D409,272 S | * | 5/1999 | Laney | D22/126 |
| D412,732 S | * | 8/1999 | Laney | D22/126 |
| D529,572 S | * | 10/2006 | Gaines | D22/126 |

* cited by examiner

*Primary Examiner*—Troy Chambers
(74) *Attorney, Agent, or Firm*—Richard K Thomson

(57) ABSTRACT

A fishing jig has a first teardrop-shaped body portion with a generally flat bottom that is curved upwardly toward its peripheral edges. A second semi-hourglass-shaped rudder portion is attached to one end of the body portion by a necked-down region. A hook extends from an eyelet positioned at the center of gravity of the body portion out through the tail and curls over the centerline of the rudder portion. The jig has shown remarkable capacity to imitate the movement of a minnow in both the retrieval and settling directions.

2 Claims, 2 Drawing Sheets

FISHING JIG

BACKGROUND AND SUMMARY OF THE INVENTION

The present invention is directed to the field of fishing gear. More particularly, the present invention is directed to a fishing jig which imitates the movement of a minnow during both retrieval and settling.

Numerous fishing lures are currently on the market ranging from spoons to jigs to flies to plastic "look-alike" bait. Virtually every imaginable type of bait is available for sale. Almost anything can garner some initial attention from fishermen. However, to sustain a growing demand, the bait must deliver: the proof is in what is caught. The jig of the present invention has proved effective in catching many types of fish including crappie, blue gill, perch, steel head trout, large and small mouth bass. It is believed that the effectiveness of this jig to universally attract the inquisitive fish seeking to satiate its appetite, lies in its life-like movement, both as the jig is retrieved and as the jig is allowed to settle.

The jig of the present invention comprises a) a first teardrop-shaped body portion having a generally flat bottom which is curves upwardly toward its peripheral edges; b) a second semi-hourglass shaped rudder portion joined to an end of the first body portion; c) an eyelet positioned at a center of gravity of the first body portion on a top surface thereof; d) a fishhook curling upwardly lying along a centerline of the second rudder portion; whereby when the fishing jig is tugged upwardly, it darts imitating a motion of a minnow and when the fishing jig is allowed to settle, the flat bottom and the rudder portion combine to cause the fishing jig to slide to-and-fro imitating a wounded minnow.

Various other features, advantages, and characteristics of the present invention will become apparent after a reading of the following detailed description.

BRIEF DESCRIPTION OF THE DRAWINGS

The preferred embodiment(s) of the present invention is/are described in conjunction with the associated drawings in which like features are indicated with like reference numerals, in which.

DETAILED DESCRIPTION OF THE PREFERRED EMBODIMENT(S)

Figure 1:
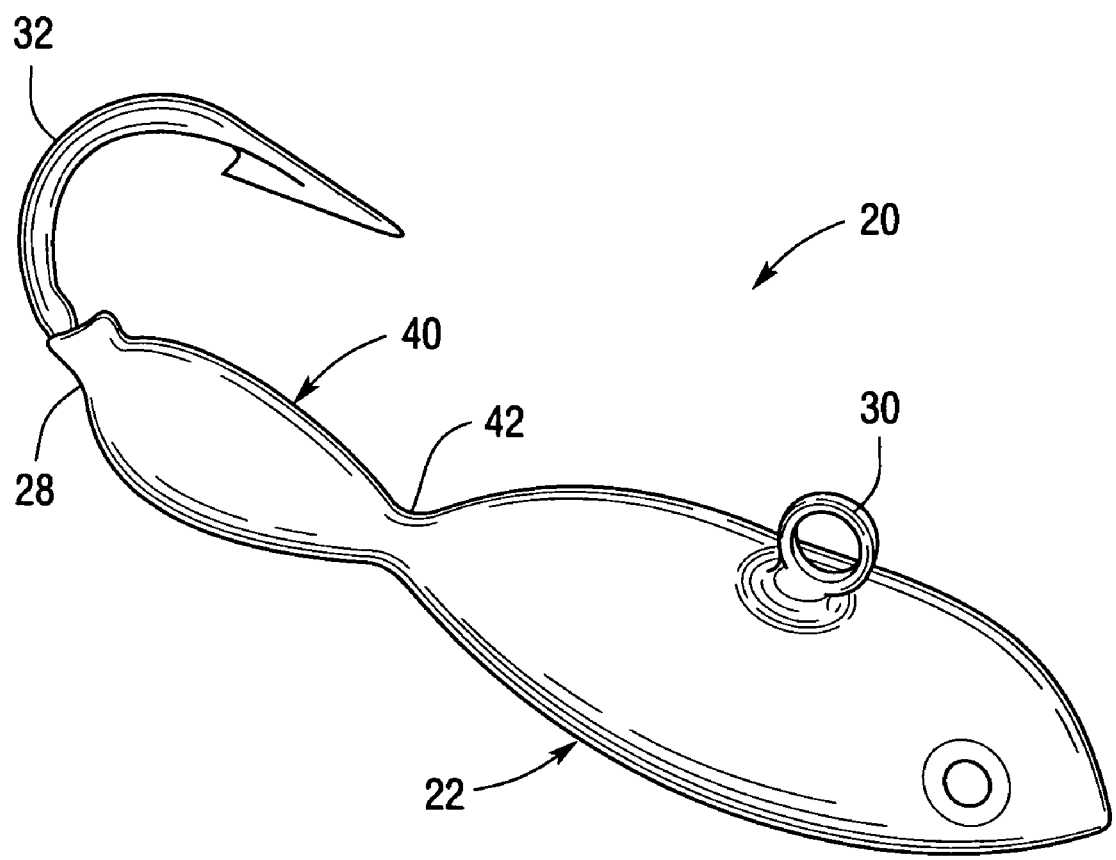
FIG. 1 is a perspective front view of a first embodiment of the fishing jig of the present invention.
Figure 2:
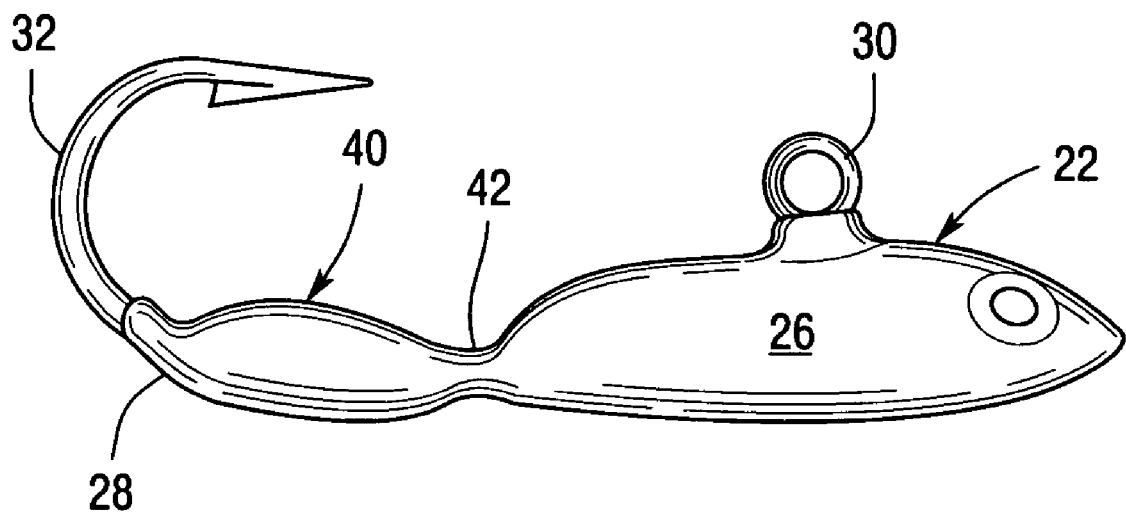
FIG. 2 is a side view of the first embodiment.
Figure 3:
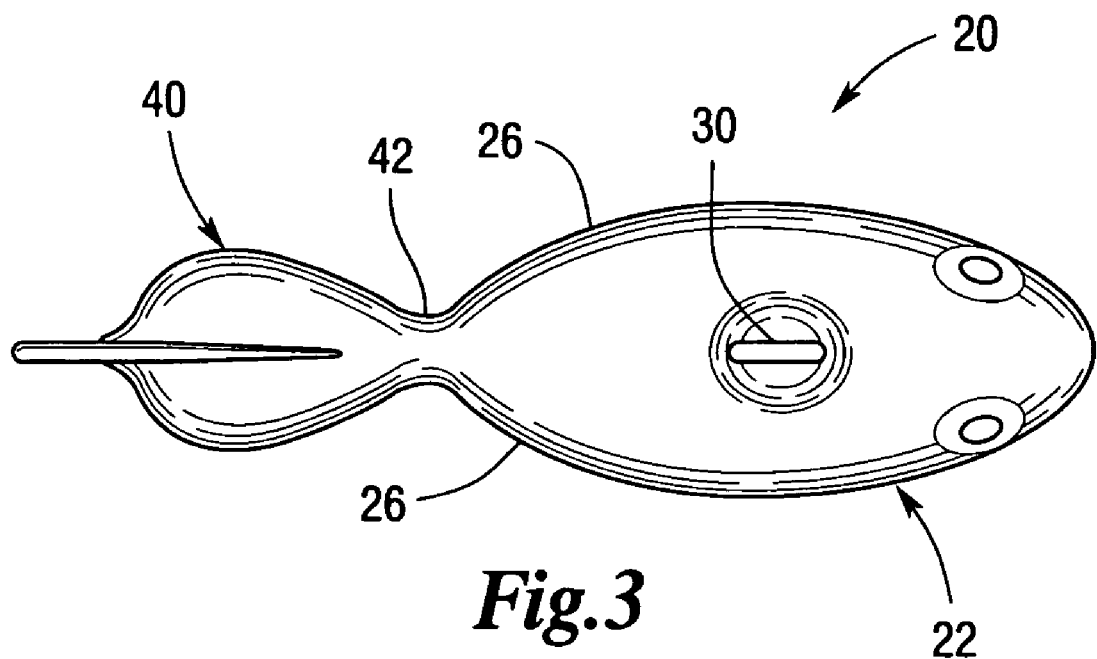
FIG. 3 is a top view of the first embodiment.

The fishing jig of the present invention is shown in FIGS. 1-3 generally at 20. Jig 20 has a first tear-dropped shaped body portion 22. Body portion 22 has a generally flat bottom 24 which is curved upwardly toward its peripheral edges 26. Eyelet 30 is positioned at the center of gravity of body portion 22. Of course, eyelet 30 is on the leading end of hook 32 which extends out the tail end 28 of jig 20 and curls upwardly and overlies the centerline of a second rudder portion 40 of jig 20. Second rudder portion 40 generally has the shape of a lower half of an hour glass and is attached to an end of body portion 22 by means of a neck-down region 42.

As the fishing jig 20 is retrieved, the semi-hourglass shaped rudder portion 40 causes the jig to dart to-and-fro as it is pulled upwardly in a manner reminiscent of a live minnow. As the fisherman allows slack in the line and the jig 20 to settle, the combination of the flat bottom 24 and rudder portion 40 cause the jig 20 to flutter in a manner similar to that of a wounded minnow. Throughout movement in both directions, the jig 20 remains in an upright, life-like position and does not roll on its side, as some jigs do. The combination of life-like movement in both retrieval and settling directions has resulted in several types of game fish taking remarkable interest in this lure and has produced a significant harvest of fish. As a result, the inventor, who originally made the jig 20 for his own personal use, believes that other fisherman will want to benefit from its effectiveness, as well.

Various changes, alternatives, and modifications will become apparent to a person of ordinary skill in the art after a reading of the foregoing specification. It is intended that all such changes, alternatives, and modifications as fall within the scope of the appended claims be considered part of the present invention.

I claim:

1. A fishing jig comprising
    a) a first teardrop-shaped body portion having a generally flat bottom throughout its length which curves upwardly toward its peripheral edges;
    b) a second shorter semi-hourglass shaped rudder portion joined to an end of said first body portion, said shorter semi-hourglass shaped rudder portion whose width side to side exceeds its height top to bottom;
    c) an eyelet positioned at a center of gravity of said first body portion on a top surface thereof;
    d) a fishhook curling upwardly lying along a centerline of said second rudder portion;
    whereby when said fishing jig is tugged upwardly, it darts imitating a motion of a minnow and when said fishing jig is allowed to settle, said flat bottom and said rudder portion combine to cause said fishing jig to slide to-and-fro imitating a wounded minnow.

2. The fishing jig of claim 1 wherein said second semi-hourglass shaped rudder portion is attached to said teardrop-shaped body portion by a necked down region said necked down region having a length appreciably shorter than said first teardrop-shaped portion and said second semi-hourglass shaped rudder portion.

* * * * *